US006462755B1

United States Patent
Anthias

(10) Patent No.: US 6,462,755 B1
(45) Date of Patent: *Oct. 8, 2002

(54) DISTRIBUTED CLIENT/SERVER WINDOW PRESENTATION

(75) Inventor: Taf Anthias, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/309,470

(22) Filed: May 10, 1999

Related U.S. Application Data

(63) Continuation of application No. 08/163,416, filed on Dec. 6, 1993, now Pat. No. 5,920,311.

(30) Foreign Application Priority Data

Dec. 22, 1992 (GB) .............................................. 9226706

(51) Int. Cl.[7] .............................................. G06F 13/00

(52) U.S. Cl. ........................ 345/733; 345/780; 345/781

(58) Field of Search ................................ 345/733, 741, 345/748, 749, 759, 764, 780, 781, 788, 798–800, 803, 806; 709/201, 203, 217

(56) References Cited

U.S. PATENT DOCUMENTS

| | | | | |
|---|---|---|---|---|
| 4,642,790 A | * | 2/1987 | Minshull et al. | 345/672 |
| 4,651,146 A | * | 3/1987 | Lucash et al. | 345/536 |
| 4,665,501 A | * | 5/1987 | Saldin et al. | 345/168 |
| 4,782,463 A | * | 11/1988 | Sanders et al. | 709/321 |
| 4,845,644 A | * | 7/1989 | Anthias et al. | 345/803 |
| 4,954,966 A | * | 9/1990 | Mooney et al. | 340/825.02 |
| 5,175,813 A | * | 12/1992 | Golding et al. | 345/684 |
| 5,461,716 A | * | 10/1995 | Eagen et al. | 345/733 |
| 5,920,311 A | * | 7/1999 | Anthias | 345/741 |

* cited by examiner

Primary Examiner—Crescelle N. dela Torre
(74) Attorney, Agent, or Firm—Douglas H. Lefeve

(57) ABSTRACT

This invention addresses the management of window geometry (or layout) in a distributed data processing system. In this invention, a client server model includes an application executing on a client system with graphics being drawn on the server system for the end user. Each client application interacts with the user by defining client windows into which are placed graphical data and where input data may be entered by the user. The application software together with the graphics software is provided in the client processor. The server processor includes the ability to display data to the end user. The application data for display, in the form of a window, includes a special designated area within the window to provide user access to the application.

4 Claims, 2 Drawing Sheets

DISTRIBUTED CLIENT/SERVER WINDOW PRESENTATION

This is a continuation of application Ser. No. 08/163,416, filed Dec. 6, 1993 now U.S. Pat. No. 5,920,311.

TECHNICAL FIELD

The present invention relates to distributed data processing systems. More particularly, this invention relates to management of the window geometry (or layout) in a distributed client/server presentation system.

BACKGROUND OF THE INVENTION

In a distributed data processing system, a computer user typically interacts with a local computer terminal which is known as the server system. The server system is connected functionally, by means of a communications network, to a remote data processing system which is known as the client system. The server system is not necessarily situated any great distance from the client system. An example of such a distributed data processing system is a PC workstation and host processor in a local area network where the client processing system and the workstation server are in the same building or possibly even the same office. A server system may also be connected to more than one client system.

In known distributed data processing systems in which an application is operating on the client system and corresponding graphics data is being drawn on the server system (where the end user is), the client application interacts with the user by defining client windows into which is placed graphical data and from which input entered by the user is received. An example of such input is mouse movement events when the mouse-pointer/cursor is in the window. The graphics input and output capability is provided by the server presentation system. The presentation system of a computer system is the layer of the architecture that provides the functions that may be selected by the application layer such as exchange, display and control of structured data. The server provides the support in the end-user node to process drawing and other requests for output and to direct the generated input to the correct place. The server may be interfacing with a number of client systems as the user may be executing applications which reside on a number of connected client nodes. The server needs to have sufficient understanding of the way the output area of the screen is used to allow clients to receive input and coordinate their drawing on to the appropriate local server terminal.

When the user moves the mouse (or cursor), a mouse (or cursor) event is generated. As the server may be used by a number of client nodes, it is not possible to route an (x,y) value to a client windowing component unless the server can identify that this client node owns the relevant part of the display. Clearly, the server needs to have some understanding of the window geometry. For example, it needs to know to which client system to send a specific mouse-generated event. Usually this would be the client system which owned that part of the screen where the pointer/cursor is.

There are other factors which require the server to have some understanding of the display window geometry. For example, in the case of overlapping windows, when a window is deleted by a client, other clients need to be told when and in which regions they need to repaint the data uncovered as a result of the deletion.

In known presentation systems such as X-Windows, which is a presentation system of the UNIX (registered trademark of Unix Systems Laboratories, Inc.) operating system software, the entire window geometry is stored in the server. This leads to unnecessary storage and processing overheads in the server, as well as unnecessary network traffic to create and modify these application windows.

SUMMARY OF THE INVENTION

Viewed from one aspect, the present invention provides a data processing system comprising: a remote processor and associated memory coupled to a local processor and associated memory; the remote processor including means for executing a plurality of application programs and sending window display data generated by the application programs to the local processor, the local processor including means for receiving the window display data and drawing the data as respective application windows, each containing one or more subarea windows within their perimeter, and where the application programs designate one or more of the subarea windows as an action field through which a user may access the respective application program, and is characterized in that display data common to both an application window and a corresponding action field is stored in the memory associated with the local processor and remaining display data is stored in the memory associated with the remote processor.

In accordance with the present invention, much of the information for a specific window can be managed entirely within the client presentation layer (for example, style information, callback addresses, etc.). The invention recognizes that not all windows generated in a client application program need to be externalized to the server. Only those for which the server needs to perform some different processing need to be externalized. An advantage of this approach is that it leads to a reduction in the network traffic necessary to create and modify application windows. A further advantage is the reduction in storage requirements and processing overheads in the server system.

BRIEF DESCRIPTION OF THE DRAWING

In order that the invention may be fully understood, a preferred embodiment thereof will now be described, by way of example only, with reference to the accompanying drawings in which.

BEST MODE FOR CARRYING OUT THE INVENTION

Figure 1:
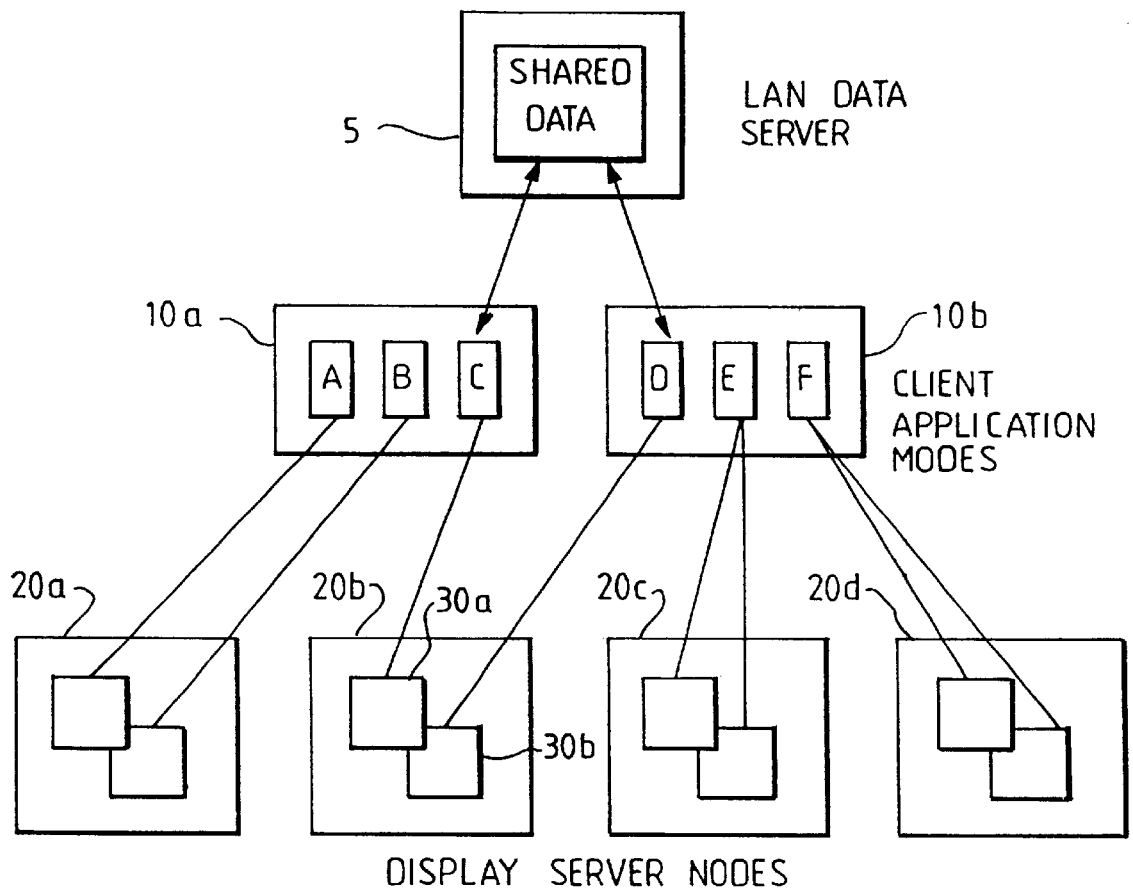
FIG. 1 shows a schematic diagram of a distributed data processing system.

FIG. 1 shows an example of a distributed data processing system. The client nodes are indicated at 10a and 10b and the server nodes are indicated at 20a, 20b, 20c and 20d. Each of the client nodes are running three applications respectively. It can be seen that server node 20b is accessing an application on each of the client nodes. The resulting display from application C is displayed in window 30a on the display server node 20b and the resulting display of application D is displayed in 30b. The LAN server 5 is used by each client node to access shared data.

The applications (A, B, C, D, E, F) define client application windows (e.g., 30a, 30b). The client presentation system only externalizes to the server the minimum needed for it to carry out its responsibilities. The client presentation system holds all other data required for drawing the main application windows 30a, 30b.

Figure 2:
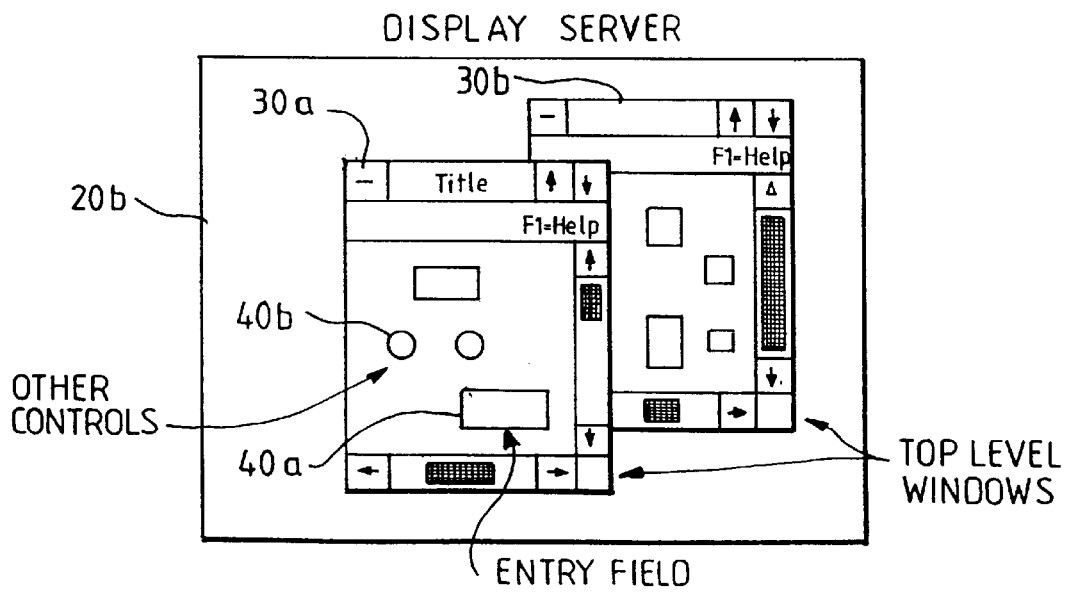
FIG. 2 shows an example of the screen display of a server node showing windows and corresponding device areas.

The server maintains the window geometry in a list of device areas. This terminology is used to distinguish them from windows (such as 30a and 30b) as seen by the applications. A typical server screen display showing application windows and corresponding device areas is shown in FIG. 2. A device area is a subarea window displayed within an application window and which is designated by the application program as an action field through which a user may write to the application.

Compared to an application window, a device area is a light-weight structure in that only a minimal amount of attribute data is required for it to be drawn on the screen. It is similar to a window but contains only a portion of the window information. Device areas are maintained in a priority ordered list, not a hierarchy, in the server. In comparison with the prior art, the server overheads in both processing time and storage requirements are reduced as the complete set of application window data is not stored at the server. The order of the device areas in the ordered list changes when the priority of a device area changes, e.g., when overlapping windows are redrawn in a different order by the client system so that a window which previously overlapped another window becomes itself overlapped. Preferably, device areas are not used for drawing into by applications running on the client system. The separation of input-related and output-related window geometry allows many optimizations to take place. The server only needs the device areas once the data is drawn to the display.

With the approach described herein, it can be seen that both the number of windowing areas and the contents of a windowing area are reduced.

A pointer/cursor can be associated with a device area. The server responds to mouse movement by redrawing the associated pointer when the mouse x,y value falls within the device area.

Device areas are allocated for all top-level windows so as to allow routing to the appropriate client node when the input is entered into that part of the display by the user. Allocating device areas for each control in a dialog is unnecessary if there is no difference in what the server will do as a result. For example, input would go to the same node as the parent top-level window, the default system pointer may be used for all controls in the dialog and repainting can be handled by the client system driving the appropriate window painting procedures.

Device areas are shown in FIG. 2 at 40a and 40b. The device area structure contains the following data:

x, y, cx, cy (position and size in screen coordinates)

input interest settings (e.g., mouse move required)

pointer handle for device area handle of client connection handle of savebits data (backing store).

Figure 3:
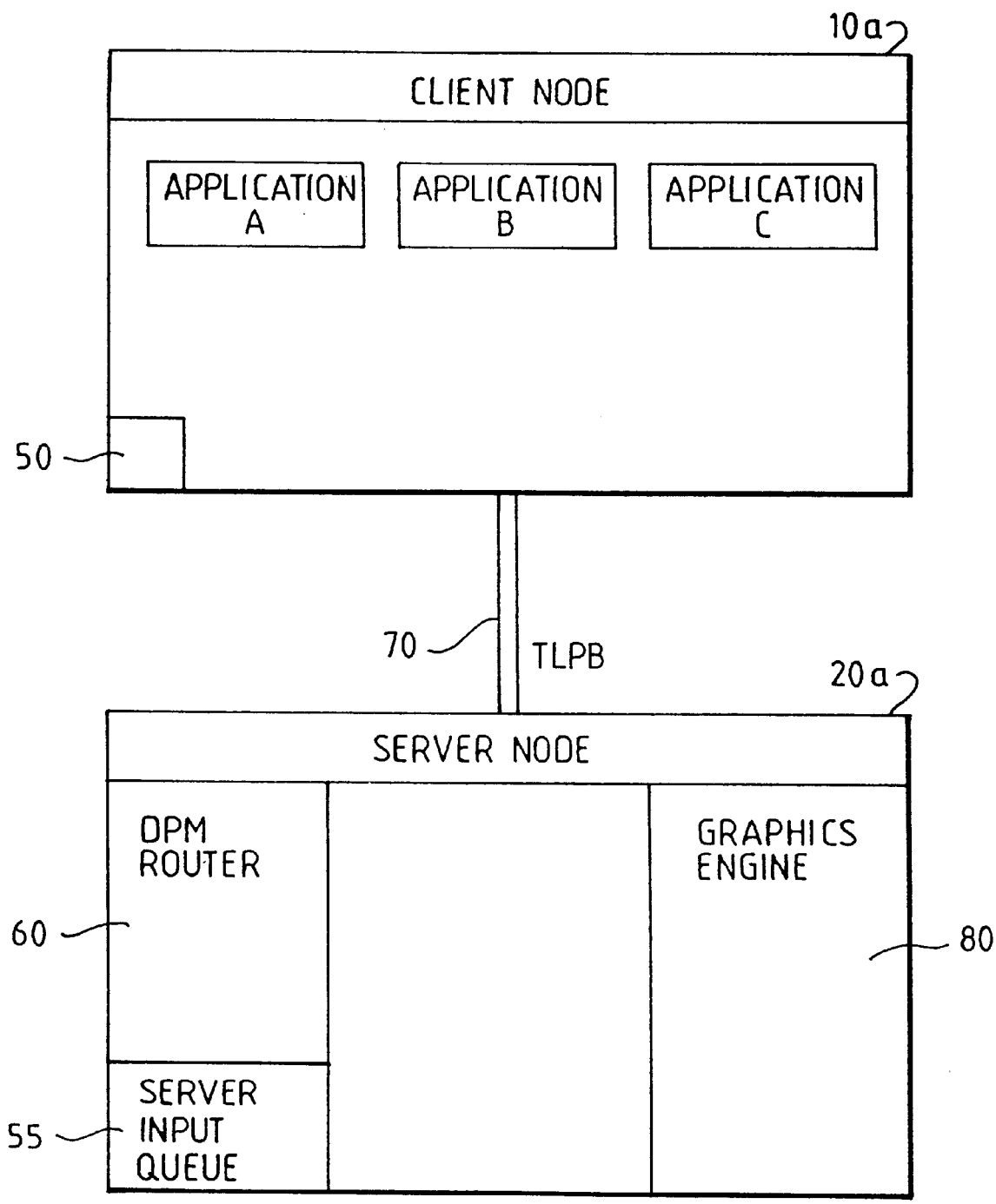
FIG. 3 shows a schematic diagram of the structure of a distributed data processing system.

FIG. 3 shows schematically the structure of the client and server. systems of a distributed data processing system. In this diagram, it is assumed that the server is remote to the client system. The client system 10a contains the entire application (A, B, C). The application message queue 50 resides in the client and is updated by the client presentation system from input received via the server input queue 55 and from messages generated on client nodes. The client system interfaces (via the presentation system router) with the server system. The data sent between client and server presentation systems is known as the presentation system protocol. The transport mechanism is the Transport Layer Protocol Boundary (TLPB) 70.

The majority of protocol requests are handled by the graphics engine component 80 of the server, which interfaces with the display device driver to output graphics data to the display.

The steps taken in the creation of a device area in a distributed data processing system are shown in Table 2. First of all, the main window, such as 30a of FIG. 2, is created in the client system. At this stage, the data required to draw the main window on the screen of the server is stored in the client system. This data includes such attributes as window size, position, color, fonts, addresses, etc. A device area is then defined in the client presentation system. This device area is associated with the frame of the main window. The information necessary to define a device area is much less than that required to define a main window. In a preferred embodiment of the present invention, five data fields (shown in Table 1) are necessary to define a device area, whereas about 200 are required to define a main window. Next, the client presentation system associates a particular cursor type with the device area. Preferably the cursor type which will appear in the device area when it is displayed on the screen of the server node is different from the cursor type which will appear in other parts of the window associated with that device area. The cursor will change shape (or color or flashing frequency) as it passes from the background window areas to the device area. One reason for this cursor change is to indicate to a user that the cursor has entered an entry field of the window. More device areas are then created by the client presentation system as required.

TABLE 1

DEVICE AREA CREATION IN CLIENT

| CLIENT APPLICATION SYSTEM | CLIENT PRESENTATION SYSTEM | SERVER PRESENTATION SYSTEM |
|---|---|---|
| create main window (window data) | define device area for frame associate standard cursor with device area | |
| create dialogue subwindows (buttons, list boxes, input fields) | | |
| (only a subset of window info is needed for the device area) | scan subwindows for variations from main window For text input fields requiring special cursor define device area to request server to change cursor - similarly for other windows requiring variation send device areas to server | |
| | Draw subwindows into main window | process user input according to device area geometry |

TABLE 2

DEVICE AREA CREATION IN CLIENT

| CLIENT APPLICATION SYSTEM | CLIENT PRESENTATION SYSTEM | SERVER PRESENTATION SYSTEM |
| --- | --- | --- |
| | (Subwindows not externalized to server as device areas appear like pure graphics) | For input device (e.g., mouse movement) examine device area list to find device area for new x, y position. Change to new cursor if necessary. For input keys, generate host input for client system owning device areas. |

Dialogue windows are created in the client system. These subwindows are scanned for variations by the presentation system of the client system. The client presentation system then defines a device screen to request the server to change the cursor for text input fields which require a special cursor. If, after a check, there are no more variations from the main window, the data representing the device areas is sent to the server by the client presentation system. The remaining data representing the main window is retained by the client system. The subwindows are drawn into the main window. Any user input is then processed by the server presentation system.

What is claimed is:

1. A computer program product for use in a data processing system, said data processing system including a display terminal, a local processor connected to said display terminal and connected to a local processor memory, a remote processor enabled to execute a plurality of application programs and connected to both said local processor and a remote processor memory, said program product comprising a computer usable medium having:

computer readable program coded embodied in said medium for enabling said remote processor to send window display data generated by said application programs to said local processor;

computer readable program coded embodied in said medium for enabling receipt of said window display data and drawing respective application windows, each of said application windows containing at least one subarea window within its perimeter;

computer readable program coded embodied in said medium for enabling said application programs to designate at least one of said subarea windows as an action field through which a user may access a respective application program;

computer readable program code embodied in said medium for enabling storing said respective application program window display data common to both one of said application windows and said corresponding action field in said local processor memory; and computer readable program code embodied in said medium for enabling storing window display data defining a remaining portion of said one of said application windows outside said subarea designating said action field, in said remote processor memory.

2. The computer program product as claimed in claim 1, further comprising:

computer readable program code embodied in said medium enabling entering user input data for an application program in one of said action fields; and computer readable program coded embodied in said medium enabling sending said user input data from said local processor to said remote processor for execution.

3. In a data processing system including a display terminal, a local processor connected to said display terminal and connected to a local processor memory, a remote processor enabled to execute a plurality of application programs and connected to both said local processor and a remote processor memory, a method for distributed client/server window presentation comprising:

sending, from said remote processor, window display data generated by said application programs to said local processor;

receiving said window display data at said local processor and drawing respective application windows, each of said application windows containing at least one subarea window within its perimeter;

designating, by said application programs, at least one of said subarea windows as an action field through which a user may access a respective application program;

storing said respective application program window display data common to both one of said application windows and said corresponding action field in said local processor memory; and storing window display data defining a remaining portion of said one of said application windows outside said subarea designating said action field, in said remote processor memory.

4. The method for distributed client/server window presentation as claimed in claim 3, further comprising:

entering, by said user, input data for an application program into one of said action fields; and sending said input data from said local processor to said remote processor for execution.

* * * * *